Jan. 10, 1928. 1,655,433
S. M. MORRIS
VACUUM RELIEF MEANS FOR WATER PIPE LINES
Filed Aug. 23, 1924 2 Sheets-Sheet 2

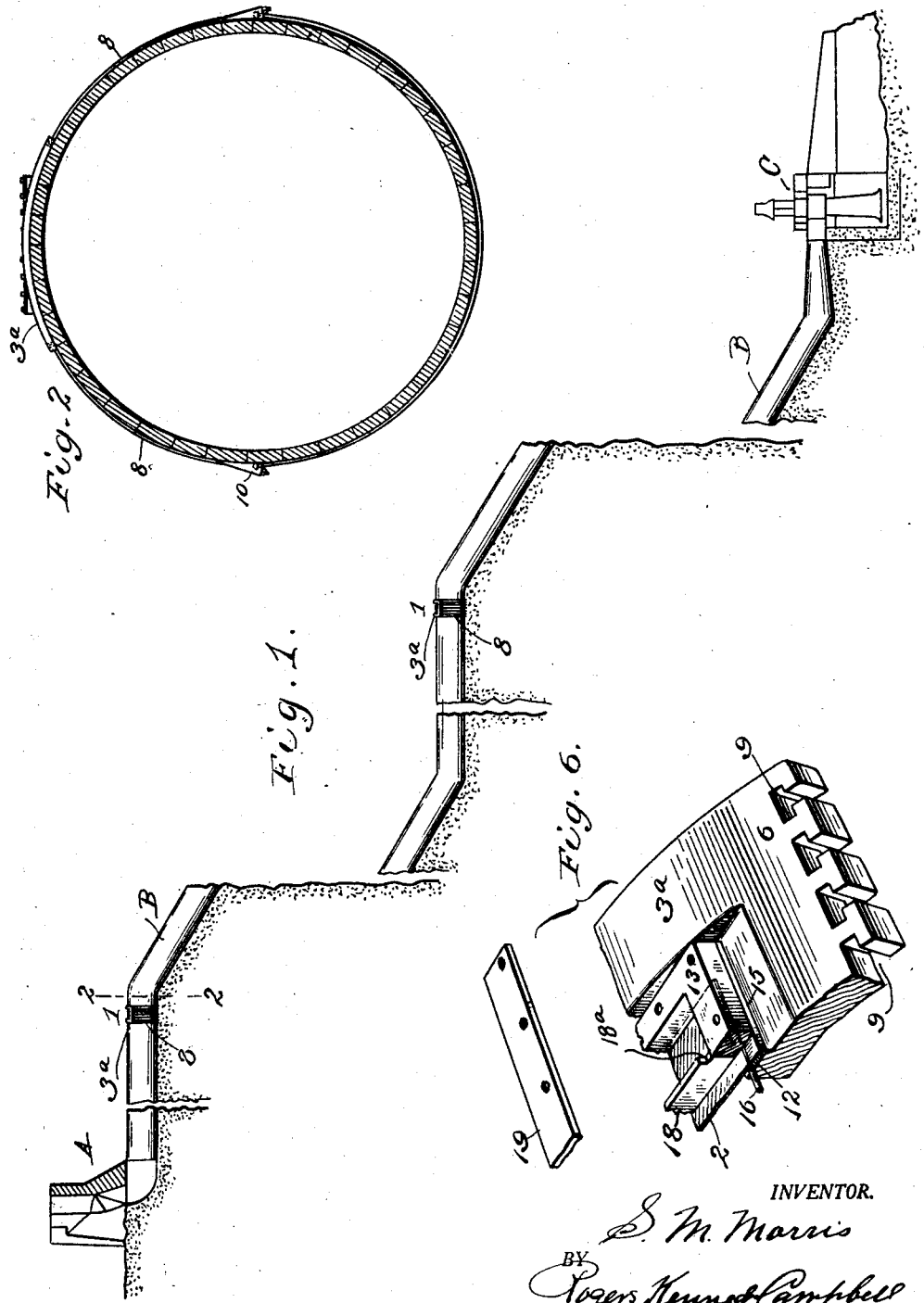
Jan. 10, 1928.
S. M. MORRIS
1,655,433
VACUUM RELIEF MEANS FOR WATER PIPE LINES
Filed Aug. 23, 1924
2 Sheets-Sheet 1
INVENTOR.
S. M. Morris
BY
Rogers, Kennedy Campbell
ATTORNEYS.

INVENTOR
S. M. Morris
By Rogers, Kennedy Campbell ATTORNEYS

Patented Jan. 10, 1928.

1,655,433

UNITED STATES PATENT OFFICE.

STEWART M. MORRIS, OF ELMHURST, NEW YORK, ASSIGNOR TO INTERNATIONAL PAPER COMPANY, A CORPORATION OF NEW YORK.

VACUUM RELIEF MEANS FOR WATER-PIPE LINES.

Application filed August 23, 1924. Serial No. 733,687.

This invention relates to pipe or conduit systems employed more particularly for conducting water from a source of supply at one point, such as a dam or the like, and delivering it to another point to a power unit or units such as water turbines and the like. Such conduits in many cases lead to a comparatively low level with reference to the level of the dam, and in the event of the conduit giving away at a sufficiently low level to cause a rapid rush of the water column, a strong suction will be created in the conduit, and since the conduit is closed above the break by the water of the dam, with no opportunity for the entrance of air into the conduit, the tendency to the creation of a vacuum by the suction will cause the atmospheric pressure on the exterior of the conduit to collapse the same. A similar tendency to the collapse of the conduit will occur in the event of a sudden closing of the intake gate of the dam, or a sudden opening of the outlet gate at the delivery point of the conduit, or a sudden obstruction at the intake, from ice, trash or the like, in all of which cases the outflow of the water from the conduit being greater than the inflow, the tendency to the creation of a vacuum will follow with the objectionable results mentioned.

It is the aim of the present invention to prevent such injury to or collapse of the conduit under the conditions mentioned, and to this end the invention consists in providing the conduit with a section adapted when subjected to suction within the conduit to yield inwardly and thereby admit air to the conduit, suitable means being provided to reenforce the said section against outward movement so that in the normal operation of the conduit the said section will be prevented from giving under the pressure of the flowing water and will form in effect a part of the wall of the conduit.

In the more specific embodiment of the invention, the yielding section of the conduit is in the form of a relatively thin plate of a deformable material, such as lead, which is clamped, preferably frictionally, at its edges to the margin of an opening extending through the wall of the conduit, and is reenforced on its exterior by a grating overlying the plate and preventing the outward yield of the plate from the pressure of the fluid within the conduit while exposing the exterior of the plate to the pressure of the atmosphere, the frictional hold of the plate over the opening being such that when subjected to suction within, such as would follow from the rush of water in the event of the conduit giving away or from the other conditions described, the pressure of air on the exterior of the plate will deform the latter, force the same inwardly and draw it away from the marginal edge of the opening at one or more points, thereby opening the conduit to the entrance of air and preventing the suction from collapsing the conduit.

The detailed form of the invention embodying the above characteristics will be fully described in the specification to follow, and the novel features thereof will be set forth in the appended claims.

In the accompanying drawings:

Fig. 1 is a view in the nature of a diagram of a conduit system having my invention applied thereto.

Fig. 2 is a cross section through the same on an enlarged scale on the line 2—2 of Fig. 1.

Fig. 6 is a fragmentary perspective view showing certain details of the device.

Figure 3:
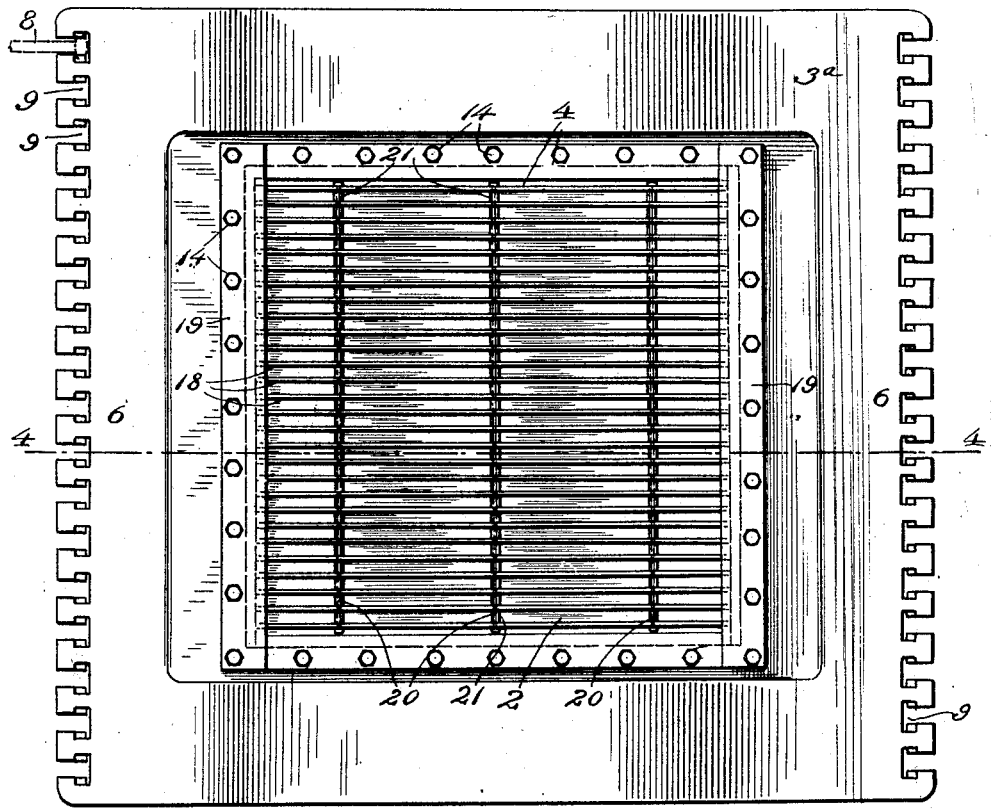
Fig. 3 is a plan view on a still larger scale of the yielding section of the conduit and its supporting frame and confining parts.
Figure 4:
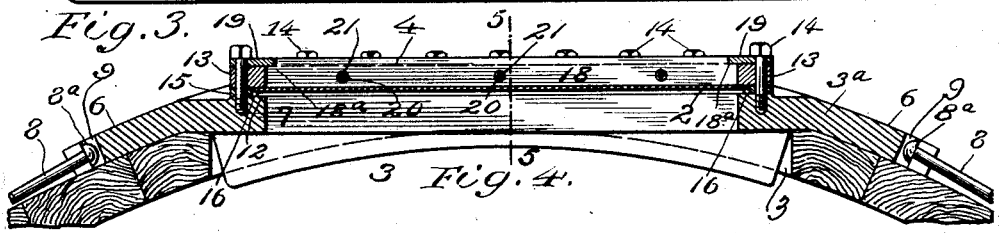
Fig. 4 is a sectional elevation of the same on the line 4—4 of Fig. 3 applied to the conduit.
Figure 5:
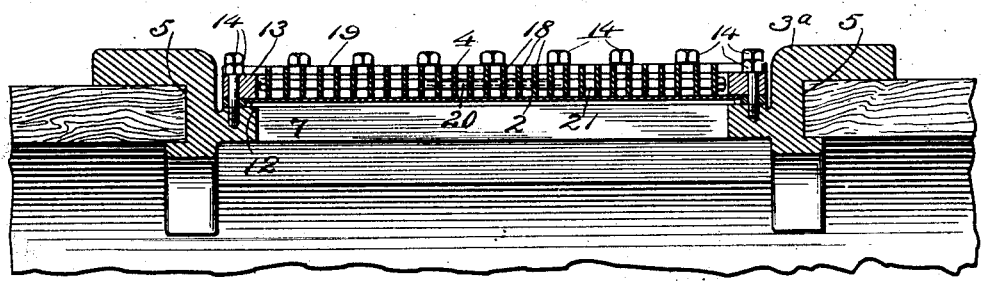
Fig. 5 is a cross section taken longitudinally of the conduit on the line 5—5 of Fig. 4.

Referring to the drawings:

Referring more particularly to Fig. 1, water from a dam A is conducted by a conduit B to a power unit C at a considerably lower level than that of the dam, and my improved device, designated as a whole by the numeral 1, is applied at two points in the conduit.

The said device comprises as its main features a plate 2 which is applied over an opening 3 formed in the wall of the conduit, and a grating 4 overlying the plate and confined on the conduit, the said parts being of such relative form and construction and so applied that the plate will yield inwardly and admit air to the conduit and thus prevent the collapse of the same when the plate is subjected to suction within the conduit, such as would be produced by the rush of water through a hole or break in the conduit or from the other conditions described, but in the normal operation of the conduit will be prevented from being forced outwardly by the pressure of the fluid within. In order to function in this manner I have found it suitable to employ a plate of some deformable material such as lead, and to fasten it at its marginal edges frictionally around the edges of the opening in the conduit, the effect of the suction in such cases being to bend or deform the plate inwardly and withdraw its edges from its seat and thus open communication between the interior of the conduit and the external air and thereby permit the air to enter the conduit and relieve the vacuum which would otherwise be created by the rush of the water. Or the plate can be fastened fixedly around the edges of the opening in the conduit and be formed of a thickness and of a material which would be ruptured by the suction within the conduit, the action in both cases involving an inward yield or deformation of the plate and the admission of air to the interior of the conduit for the purposes set forth. Other forms and arrangements of the parts may be resorted to, the essential feature being the provision of a conduit with a local portion or section which will yield inwardly when subjected to suction from within the conduit, and will be reenforced against outward movement and maintained so as to form in effect a part of the conduit in resisting the pressure of the fluid from within.

In the illustrated form of the invention, the plate is shown as held frictionally over the opening through the wall of the conduit, merely by way of example of one embodiment of the invention, but it will be understood that the invention is not limited to the particular form and construction of parts shown, which may be variously modified and changed without departing from the spirit of the invention; and it will be further understood that the invention is not limited to any particular form or construction of the parts except in so far as such limitations are specified in the claims.

In the embodiment of the invention illustrated the opening 3 in the wall of the conduit is surrounded by a rectangular open supporting frame or casting 3ª which is formed in its opposite edges with grooves 5 which receive the transverse walls of the opening, and has its other edges extended circumferentially of the conduit some distance as at 6 so as to overlie the wall of the conduit adjacent the longitudinal walls of the opening therethrough. The opening 7 in the supporting frame is of rectangular form and conforms to the opening 3 in the wall of the conduit, and in the present instance the frame is held in place on the conduit to surround the opening 3 by means of a number of tie rods 8 which surround the conduit and are provided on their ends with heads 8ª engaged in recesses 9 formed in the longitudinal edges of the supporting frame, the said tie rods being furnished with turn buckles 10 for tightening them up. The supporting frame is formed around its inner marginal edges on the upper side, with a flat seat 12 on which is clamped the marginal edges of the plate 2 by means of a rectangular open clamping frame 13 held down on the seat by means of clamping bolts 14 passing through the clamping frame and screwed into the supporting frame, a packing strip or gasket 15 being interposed between the adjacent faces of the clamping frame and seat to prevent the escape of water therebetween. The inner edge of the clamping frame extends inwardly beyond the inner edge of the gasket and bears on the marginal edges of the plate 2, between which and the supporting seat is inserted a gasket 16 in the present instance circular in cross section, so as to prevent the escape of the water between the plate and supporting frame.

Overlying the plate 2 is the grating 4 constituting in effect a reenforcing means for the plate to prevent the same from being forced or moved outwardly by the pressure of the water flowing through the conduit in the normal operation of the same. This grating in the present instance is formed by a number of slats 18 which are set on edge in spaced relation to each other on the plate, and confined thereon and on the clamping frame by means of two fastening strips 19 clamped down on the clamping frame by the clamping bolts 14 before alluded to and extending inwardly and engaged in notches 18ª formed in the edges of the slats, the said slats being maintained in spaced relation to each other and connected together in the form of a unitary open structure by means of tie rods 20 passing transversely through the slats and through spacing spools 21 arranged between the slats.

The grating overlying the plate 2 and confined in the manner described acts to reenforce the plate against outward movement, while the spaces between the slats expose the plate to the pressure of the external air, so that the plate will be moved inwardly by said pressure and deformed to a degree which will admit the air to the interior of the conduit when the inner side of the plate is subjected to suction within the conduit as before explained.

In the normal operation of the conduit in the particular embodiment of the invention shown by way of example, with the water flowing therethrough under the head produced by the higher level of the dam, the plate forms in effect a part of the wall of the conduit, and by means of the grating 17 is reenforced as described against outward movement or deformation from the pressure within the conduit. In the event however of the conduit giving away, the suction created by the rush of the water through the break will cause the pressure of the outside air on the plate to force the same inwardly and admit air to the interior of the conduit as described, thereby relieving the tendency to the creation of a vacuum within the conduit and preventing the collapse of the same. It will be understood that in such cases a new plate will be applied over the opening in the conduit wall to take the place of the deformed or ruptured plate, and suitable repairs will be made to the conduit at the point where the break occurred to reestablish the intact and normal condition of the same.

What I claim is:

1. In combination with a conduit provided with an opening through the wall thereof, a plate applied over said opening, clamping means acting on the plate to hold it frictionally in place, the said plate being adapted to be drawn away from the clamping means by suction within the conduit and thereby admit air, and means for restraining the plate against outward movement from the pressure within the conduit.

2. In combination with a conduit provided with an opening through the wall thereof having a surrounding seat, a plate applied over said opening, means for clamping the plate frictionally on said seat, whereby suction within the conduit will draw the plate from its seat and admit air to the conduit, and means for restraining the plate against outward movement from the pressure within the conduit.

3. In combination with a conduit provided with an opening through the wall thereof, an opening supporting frame surrounding said opening formed with a marginal seat, a plate applied over said opening, a clamping frame applied to the marginal edges of the plate and confining the same frictionally on the seat, and a grating overlying the plate and confining the same.

4. In combination with a conduit provided with a rectangular opening in the wall thereof, an open rectangular supporting frame surrounding said opening and formed in its transverse ends with grooves receiving the transverse walls of the opening, said frame having its longitudinal ends extended to seat on the exterior of the conduit adjacent the longitudinal walls of the opening therein, tie rods engaged with the longitudinal ends of the frame and extending around the conduit to hold the frame in place, a plate fastened to the marginal edges of the opening in the supporting frame to cover the opening in the conduit, said plate adapted to yield inwardly from suction within the conduit, and means carried by the frame and overlying the plate to restrain outward movement of the same.

In testimony whereof, I have affixed my signature hereto.

STEWART M. MORRIS.